United States Patent [19]

Oishi et al.

[11] Patent Number: 4,954,567

[45] Date of Patent: Sep. 4, 1990

[54] PROCESS FOR PREPARING POLYVINYL ALCOHOL HAVING HIGH DEGREE OF POLYMERIZATION

[75] Inventors: Tsukasa Oishi, Muko; Tomohisa Okuda, Nara, both of Japan

[73] Assignee: Nippon Gohsei Kagaku Kogyo Kabushiki Kaisha, Osaki, Japan

[21] Appl. No.: 176,534

[22] Filed: Apr. 1, 1988

[30] Foreign Application Priority Data

May 30, 1987 [JP] Japan .................................. 62-137346

[51] Int. Cl.$^5$ ................................................. C08F 8/00
[52] U.S. Cl. ......................................... 525/62; 526/319
[58] Field of Search ............................ 525/62; 526/319

[56] References Cited

U.S. PATENT DOCUMENTS

| | | | |
|---|---|---|---|
| 2,478,431 | 8/1949 | Stamatoff | 525/62 |
| 2,502,715 | 4/1950 | Germain et al. | 525/62 |
| 2,860,124 | 11/1958 | Starck et al. | 525/62 |
| 3,105,065 | 9/1963 | Fujii et al. | 526/319 |
| 3,124,562 | 3/1964 | Naito et al. | 525/62 |
| 3,303,174 | 2/1967 | Lanthier | 526/319 |
| 3,487,060 | 12/1969 | Bristol | 525/62 |
| 3,884,892 | 5/1975 | Winkler et al. | 525/62 |
| 4,463,138 | 7/1984 | Wu et al. | 526/319 |

FOREIGN PATENT DOCUMENTS

| | | | |
|---|---|---|---|
| 3000750 | 7/1981 | Fed. Rep. of Germany | 525/62 |
| 0156913 | 9/1982 | Fed. Rep. of Germany | 525/62 |
| 0238054 | 8/1986 | Fed. Rep. of Germany | 525/62 |
| 0019694 | 3/1973 | Japan | 525/62 |
| 0142766 | 8/1958 | U.S.S.R. | 525/62 |
| 0143552 | 7/1961 | U.S.S.R. | 525/62 |
| 0749458 | 5/1956 | United Kingdom . | |
| 0881585 | 11/1961 | United Kingdom | 525/62 |

Primary Examiner—Joseph L. Schofer
Assistant Examiner—J. M. Reddick
Attorney, Agent, or Firm—Armstrong, Nikaido, Marmelstein Kubovcik & Murray

[57] ABSTRACT

A process for preparing a substantially particulate polyvinyl alcohol having a high degree of polymerization of which a 4% by weight aqueous solution has a viscosity at 20° C. of not less than 80 cps, which comprises hydrolyzing a substantially particulate polyvinyl ester having a high degree of polymerization in an alcohol containing an alkali catalyst in heterogeneous system. According to the process of the present invention, there can be easily produced a substantially particulate polyvinyl alcohol having high degree of polymerization, which has the high bulk density and the excellent powder flowability.

8 Claims, No Drawings

PROCESS FOR PREPARING POLYVINYL ALCOHOL HAVING HIGH DEGREE OF POLYMERIZATION

BACKGROUND OF THE INVENTION

The present invention relates to a process for preparing a polyvinyl alcohol having a high degree of polymerization, and more particularly to a process for preparing a substantially particulate polyvinyl alcohol having a high degree of polymerization which comprises hydrolyzing a substantially particulate polyvinyl ester having a high degree of polymerization in a heterogeneous system.

A polyvinyl alcohol is obtained, as is known, by hydrolyzing a polyvinyl ester and it is required to hydrolyze a polyvinyl ester having high degree of polymerization in order to obtain a polyvinyl alcohol having a high degree of polymerization.

As methods for obtaining a polyvinyl ester having a high degree of polymerization, there are known a bulk polymerization of a vinyl ester at low temperature [as described in, for instance, Sakusanbinirujushi (Vinyl acetate resin), 69–78, edited by Ichiro Sakurada], a suspension polymerization of a vinyl ester at low temperature (as described in, for instance, Sakusanbinirujushi, 85–87 or Japanese Unexamined Patent Publication No. 148209/1986), a photopolymerization of a vinyl ester at low temperature (as described in, for instance, Japanese Examined Patent Publication No. 17848/1960, U.S. Pat. No. 4,463,138 or Japanese Unexamined Patent Publication No. 64807/1987), and the like.

In order to obtain the polyvinyl alcohol having a high degree of polymerization from the polyvinyl ester obtained according to each above-mentioned methods, the polyvinyl ester is dissolved in an alcohol and then hydrolyzed with an alkali catalyst in a usual manner. However, when conducting the methods on an industial scale, it is required to limit the concentration of the alcohol solution of polyvinyl ester to a very low concentration, such as from 5 to 6% by weight at the highest as described in, for instance, Japanese Unexamined Patent Publication No. 148209/1986 or No. 64807/1987. This is so because, it is difficult to stir the alcohol solution of the polyvinyl ester which does not have a low concentration of the polyvinyl ester in the alcohol due to its very high viscosity. Accordingly, it is required to recover a large amount of a solvent, which is when operating the method industrially.

On the other hand, as methods for preparing a particulate polyvinyl alcohol, there have hitherto been known a method in which polyvinyl ester beads are dispersed in a mixture of methanol containing an alkali catalyst and a liquid with which methanol is partially compatible, in which a polyvinyl alcohol cannot be dissolved, and in which a polyvinyl ester can be slightly dissolved, such as liquid petroleum hydrocarbons, thereby hydrolyzing the polyvinyl ester, as disclosed in, for instance, U.S. Pat. No. 2,502,715; a method in which a paraffinic hydrocarbon having a boiling temperature of not less than 30° C. is added to an alcohol solution of a polyvinyl ester to emulsify or disperse the alcohol solution in the paraffinic hydrocarbon and the hydrolysis of the polyvinyl ester is conducted by using an alkali catalyst as disclosed in BP 749,458; and the like.

The above-mentioned methods, however, have the drawback that it is required to remove the liquids such as liquid aliphatic, aromatic or naphthene hydrocarbons, which are used in the hydrolysis step, from the reaction mixture by a complex removing step.

An object of the present invention is to provide a process for industrially and easily preparing a particulate polyvinyl alcohol having a high degree of polymerization, which is high in a bulk density and excellent in a powder flowability, by efficiently hydrolyzing a polyvinyl ester having a high degree of polymerization.

This and the other objects of the present invention will become apparent from the description hereinafter.

SUMMARY OF THE INVENTION

As a result of making the earnest study for solving all of the drawbacks in conventional methods as described above, and for providing a process for industrially and easily preparing a polyvinyl alcohol having a high degree of polymerization, which is high in bulk density and excellent in powder flowability, it has now been found that a substantially particulate polyvinyl ester having a high degree of polymerization can be hydrolyzed in an alcohol having an alkali catalyst in a heterogeneous system, and the obtained polyvinyl alcohol having a high degree of polymerization has a high bulk density and excellent powder flowability.

According to the present invention, there is provided a process for preparing a substantially particulate polyvinyl alcohol having a high degree of polymerization, of which a 4% by weight aqueous solution has a viscosity at 20° C. of not less than 80 cps, which comprises hydrolyzing a substantially particulate polyvinyl ester having a high degree of polymerization in an alcohol containing an alkali catalyst in a heterogeneous system.

DETAILED DESCRIPTION

In the present invention, the method of preparing the substantially particulate polyvinyl ester having a high degree of polymerization is not limited. There are exemplified, for instance, a suspension polymerization of vinyl esters, a method in which a vinyl ester polymer or copolymer obtained by a bulk polymerization or a solution polymerization of vinyl esters is formed into particles in a known manner in which, for instance, the polyvinyl ester molten with heat is added dropwise to water; or the vinyl ester polymer or copolymer is formed into a film, sheet or fiber and the film, sheet or fiber is pulverized to give particles. Polyvinyl esters spherical in shape obtained by suspension polymerization are preferable in industrial scale.

The substantially particulate polyvinyl ester can have any shape such as sphere, cube and cylinder and the spherical shape is preferable. It is not necessary that its shape is completely spherical. That is, the substantially particulate polyvinyl ester, which is obtained in the suspension method, and the like, as described above, may include spherical particles, an agglomerate thereof, a deformed agglomerate separated from the agglomerate, and the like. The particle size of the polyvinyl ester is not particularly limited and it is usually preferable that the particle size is from 10 to 1500 μm from the viewpoint of easily handling.

In the present invention, the vinyl ester used for obtaining the polyvinyl ester is not limited. Examples of the vinyl ester are, for instance, vinyl formate, vinyl acetate, vinyl propionate, vinyl valerianate, vinyl laurate, vinyl stearate, and the like. They may be used alone or as an admixture thereof. In the industrial preparation of the polyvinyl alcohol having a high degree of polymerization, vinyl acetate is particularly preferred.

Monomers copolymerizable with the vinyl esters may be copolymerized with the vinyl esters so long as the properties of the desired polyvinyl alcohol having a high degree of polymerization are not impaired. Examples of the copolymerizable monomers are, for instance, an unsaturated acid such as acrylic acid, methacrylic acid, maleic acid, itaconic acid or crotonic acid, or its ester, its salt or its anhydride; acrylamide or methacrylamide, or its derivative; a salt of unsaturated sulfonic acid such as sodium allylsulfonate or sodium methallylsulfonate; an alkyl vinyl ether; an acetoacetyl group-containing ethylenic unsaturated monomer; an oxyalkylene group-containing unsaturated monomer; a primary, secondary or tertiary amine; an unsaturated vinyl monomer containing a quaternary ammonium salt; an $\alpha$-olefin such as ethylene, propylene, $\alpha$-octene or $\alpha$-dodecene; vinyl chloride; vinylidene chloride; vinyl fluoride; vinylidene fluoride; acrylonitrile or methacrylonitrile; a vinyl alkoxysilane; and the like.

Known methods are applicable to polymerize the vinyl ester by suspension polymerization in the present invention. The suspension polymerization can be carried out at a temperature of 0° C. to 70° C. by using a polymerization initiator. As the polymerization initiator, radical initiators capable of decomposing at low temperature can be advantageously used. Examples of the radical initiators are, for instance, a peroxy compound such as diisopropyl peroxydicarbonate, isobutyryl peroxide, bis(4-t-butylcyclohexyl)peroxydicarbonate, dimyristyl peroxydicarbonate, acetyl cyclohexylsulfonyl peroxide, di-n-propyl peroxydicarbonate, $\alpha$-cumyl peroxyneodecanoate or 2,4,4-triethylpentylperoxyphenoxyacetate; an azo compound such as 2,2'-azobis-(4-methoxy-2,4-dimethylvaleronitrile), and the like. Also, a radical initiator such as 2,2'-azobisisobutyronitrile can be used while irradiating with ultraviolet rays. Further, a redox initiator comprising an oxidizing agent such as a peroxide initiator and a reducing agent such as dimethyl aniline, l-ascorbic acid or a salt of iron can be effectively used, and radical polymerization may be initiated by irradiating with electron beam or radiation ray. The polymerization initiators or the methods for initiating the polymerization are not limited thereto.

The polyvinyl ester having a high degree of polymerization used in the invention has an intrinsic viscosity of not less than 1.2 dl/g, more preferably, not less than 1.5 dl/g. The intrinsic viscosity is measured at 30° C. in acetone with respect to a polyvinyl ester obtained by hydrolyzing the polyvinyl ester prepared by the above polymerization of the vinyl ester and acetylating the hydrolyzed ester again.

When using the polyvinyl ester having an intrinsic viscosity of less than 1.3 dl/g, the desired polyvinyl alcohol of which 4% by weight aqueous solution has a viscosity at 20° C. of not less than 80 cps cannot be obtained.

In the present invention, the polyvinyl ester having a high intrinsic viscosity can be easily handled rather than the polyvinyl ester having a low intrinsic viscosity. There can be easily obtained a polyvinyl alcohol having an ultrahigh degree of polymerization of which 4% by weight aqueous solution has a viscosity at 20° C. of not less than 150 cps.

The substantially particulate polyvinyl ester having a high degree of polymerization may contain a slight amount of volatile components such as water and an alcohol depending on the preparative method. It is preferable that the content of the volatile components in the polyvinyl ester be not more than 30% by weight, more preferably not more than 15% by weight, based on the dry polyvinyl ester. For obtaining such polyvinyl esters, if necessary, after completing the suspension polymerization, used liquids are removed from the polymerization mixture and the obtained polyvinyl ester is dried, or after completing the solution polymerization, the used solvents are removed from the polymerization mixture and the polyvinyl ester is formed into particles, and the like.

When the water content is more than 30% by weight based on the dry polyvinyl ester, not only a large amount of the alkali catalyst is consumed on hydrolysis of the polyvinyl ester but also a content of sodium acetate in the obtained polyvinyl alcohol is increased to increase a load in a step for removing sodium acetate from the obtained polyvinyl alcohol. On the other hand, when the content of the solvent for polymerization such as alcohols is more than 30% by weight in the polyvinyl ester, the polyvinyl ester is partially dissolved in the alcohol during the hydrolysis of the polyvinyl ester to increase the viscosity of the reaction system, thus resulting in difficult stirring of the reaction system, or the polyvinyl ester particles easily agglutinate to each other. Accordingly, it is difficult to obtain a polyvinyl alcohol having a high degree of polymerization, which has the high bulk density and excellent powder flowability.

The substantially particulate polyvinyl ester is hydrolyzed in the alcohol containing the alkali catalyst in a heterogeneous system.

In the invention, the alcohols usually used in the hydrolysis of a polyvinyl ester can be used. Examples of the alcohols is, for instance, methanol, ethanol, isopropanol, and the like. Methanol are preferably used. Also, alkali catalysts usually used in the hydrolysis of a polyvinyl ester can be used. Examples of the alkali catalysts are, for instance, sodium hydroxide, potassium hydroxide, sodium methylate, and the like. Sodium hydroxide is preferably used.

The concentration of the alkali catalyst in the alcohol depends on the kinds of the alcohol or the degree of polymerization of the polyvinyl ester. Generally, the concentration is selected from the range of 0.18 to 10 moles, preferably from 0.3 to 10 moles, more preferably from 0.5 to 10 moles per liter of the alcohol.

When the concentration of the alkali catalyst in the alcohol is less than 0.18 mole/l, it is hard to obtain the polyvinyl alcohol having a high degree of polymerization, which has a high bulk density and excellent powder flowability. In such a case, the hydrolysis reaction rate in the initial stage is slow, and the polyvinyl ester is partially dissolved in the alcohol increasing the viscosity of the hydrolysis reaction system, making it difficult to stir the system, or agglutination of the polyvinyl ester particles can easily occur. On the other hand, when the concentration of the alkali catalyst is more than 10 moles/l, the polyvinyl alcohol is colored by adhesion of the excess alcohol and deterioration of the qualities of the polyvinyl alcohol such as lowering of the heat resistance might result.

In the present invention, it is particularly important that the hydrolysis of the polyvinyl ester is initiated in the alcohol containing the alkali catalyst in a high concentration. When methanol is used as the alcohol, it is desirable that the hydrolysis of the polyvinyl ester is initiated in methanol containing not less than 0.18 mole/l of the alkali catalyst.

The medium in the present invention consists essentially of the alcohol and the alkali catalyst, and may contains other components such as water in a slight amount such that a specific step for removing the other components is not required.

The amount of the substantially particulate polyvinyl ester to be added to the alcohol solution is suitably decided according to the degree of polymerization of the polyvinyl ester, the concentration of the alkali catalyst in the alcohol solution, and generally, the amount is from 50 to 100 parts by weight, preferably from 10 to 50 parts by weight, to 100 parts by weight of the alcohol containing alkali catalyst.

The present invention is remarkably characterized in that the substantially particulate polyvinyl ester having a high degree of polymerization is hydrolyzed in the alcohol containing the alkali catalyst in heterogeneous system.

That is, in usual hydrolysis reactions of polyvinyl esters, it becomes difficult to efficiently hydrolyze the polyvinyl ester when increasing the degree of polymerization of the polyvinyl ester, since the hydrolysis is conducted in an alcohol solution of polyvinyl ester, using the alkali catalyst. On the other hand, according to the present invention, the hydrolysis reaction can be easily conducted when increasing the degree of polymerization of the polyvinyl ester, since the hydrolysis reaction is conducted in heterogeneous system.

The thus obtained substantially particulate polyvinyl alcohol having a high or an ultrahigh degree of polymerization has a high bulk density and excellent powder flowability. The polyvinyl alcohol is suitable for use in fibers, films, sheets, gels, and the like.

The present invention is more specifically described and explained by means of the following Examples and Comparative Examples in which all percents and parts are by weight unless otherwise noted. It is to be understood that the present invention is not limited to the Examples, and various changes and modifications may be made in the invention without departing from the spirit and scope thereof.

EXAMPLE 1

After a suspension polymerization of vinyl acetate was carried out at 40 °C. for 10 hours, the reaction mixture was subjected to a solid-liquid separation, and then the solid matter was dried at 40° C. for 28 hours under a pressure of 1 mmHg to give a polyvinyl acetate in the form of a sphere [content of volatile component (weight loss on drying at 105° C. for 3 hours): 0.4%, particle size: from 149 to 1410μ, intrinsic viscosity: 1.3 dl/g]. Into 600 parts of a methanol solution of sodium hydroxide in a concentration of 0.4 mole/l was gradually poured 100 parts of the obtained polyvinyl acetate at 50 °C. for 3 minutes with stirring, and then the stirring was continued at 50° C. for 30 minutes after completing the addition of the polyvinyl acetate to hydrolyze it. The reaction mixture was subjected to a solid-liquid separation by using a wire gauze of 350 mesh. After washing the obtained solid matter with methanol, it was dried at 90° C. for 6 hours to give a polyvinyl alcohol in the form of a sphere. The filtrate was transparent and the polymer was hardly found in the filtrate.

With respect to the obtained polyvinyl alcohol, a transparency, a viscosity, a percentage of particles having a particle size of 149 to 1410μ, a bulk density and an angle of repose were measured. The results are shown in Table 1.

[Transparency (%)]

With respect to a 1% aqueous solution of the obtained polyvinyl alcohol, a transmittance is measured at a wave length of 430 nm in a light pass length of 10 mm by using UVIDEC-650 Double beam Spectrophotometer made by JAPAN SPECTROSCOPIC CO., LTD.

[Viscosity (cps)]

With respect to a 4% aqueous solution of the obtained polyvinyl alcohol, a viscosity is measured at 20° C. by using a HÖPPLER'S VISCOSIMETER made by UESHIMA SEISAKUSHO CO., LTD.

[Particle size distribution (%)]

A percentage of particles having a particle size of 149 to 1410μ to the obtained whole particles is calculated as a particle size distribution.

[Bulk density]

With respect to the obtained polyvinyl alcohol particles having a particle size of 149 to 1410μ, a bulk density is measured according to Japanese Industrial Standards (JIS) K 6721.

[Angle of repose (°)]

An angle of repose of the obtained polyvinyl alcohol particles having a particle size of 149 to 1410μ is measured as follows:

The obtained polyvinyl alcohol particles are dropped little by little from a height of 2 to 3 cm on a metal disk having a diameter of 30 mm with a spoon, and a height (h:mm) of the accumulated particles is measured at the time when the particles cannot be accumulated any more. The angle of repose ($\theta$:°) is calculated by the following formula:

$$\tan \theta = h/15$$

wherein $\theta$ is the angle of repose and h is the height of the accumulated particles.

EXAMPLE 2

A methanol solution of a polyvinyl acetate obtained by a bulk polymerization at 40° C. was added to water, and then the solid matter was dried in the same manner as in Example 1 to give a polyvinyl acetate in the form of a sphere (content of volatile component: 0.4%, particle size: from 149 to 1410μ, intrinsic viscosity: 2.0 dl/g). The hydrolysis reaction was carried out in the same manner as in Example 1 using 100 parts of the obtained polyvinyl acetate to give a polyvinyl alcohol in the form of a sphere. Hardly any polymer was found in the filtrate. The properties of the obtained polyvinyl alcohol were measured in the same manner as in Example 1.

The results are shown in Table 1.

COMPARATIVE EXAMPLE 1

A kneader was charged with 100 parts of a dry polyvinyl acetate obtained in Example 1 and 2000 parts of methanol and the mixture was stirred at 50° C. to dissolve the polyvinyl acetate in methanol. To the methanol solution of polyvinyl acetate was added at 50° C. 2.3 parts of a 10% methanol solution of sodium hydroxide. After depositing the reaction product, the 10% methanol solution of sodium hydroxide was further added to the kneader in an amount of 100 parts, and the mixture was stirred at 50° C. for 6 hours. The reaction mixture was subjected to solid-liquid separation by using a wire gauze of 350 mesh. After washing the obtained solid matter with methanol, it was dried at 90° C. for 6 hours to give a polyvinyl alcohol in a formless state. On the other hand, the filtrate was slightly cloudy and contained about 2% of a polymer component.

The properties of the obtained polyvinyl alcohol were measured in the same manner as in Example 1. The results are shown in Table 1.

COMPARATIVE EXAMPLE 2

The procedure of Comparative Example 1 was repeated except that the amount of methanol 2000 parts was changed to 1000 parts. A polyvinyl alcohol was deposited in the form of a large block.

The properties of the polyvinyl alcohol were measured in the same manner as in Example 1. The results are shown in Table 1.

COMPARATIVE EXAMPLE 3

The procedure of Example 1 was repeated except that a methanol solution of sodium hydroxide in a concentration of 0.1 mole/l was used instead of the methanol solution of sodium hydroxide in the concentration of 0.4 mole/l. Immidiately after completing the addition of 100 parts of polyvinyl acetate to the methanol solution of sodium hydroxide, polyvinyl acetate particles were agglomerated to form a mass, and the stirring could not be conducted. After the reaction mixture was allowed to stand for 30 minutes at 50° C., the block of polyvinyl alcohol was ground to particles.

EXAMPLE 3

The procedure of Example 1 was repeated except that a polyvinyl acetate having an intrinsic viscosity of 2.2 dl/g was used instead of the polyvinyl acetate having the intrinsic viscosity of 1.3 dl/g to give polyvinyl alcohol particles. The properties of the obtained polyvinyl alcohol were measured in the same manner as in Example 1. The results are shown in Table 1.

TABLE 1

|  | Transparency (%) | Viscosity (cps) | Particle size distribution (%) | Bulk density | Angle of repose (°) |
|---|---|---|---|---|---|
| Ex. 1 | 95 | 105 | 98.9 | 0.57 | 30 |
| Ex. 2 | 95 | 700 | 97.5 | 0.60 | 29 |
| Ex. 3 | 93 | 890 | 99.2 | 0.58 | 30 |
| Com. Ex. 1 | 88 | 105 | 18.0 | 0.22 | 48 |
| Com. Ex. 2 | 70 | 105 | 0.5 | 0.20 | 49 |
| Com. Ex. 3 | * | * | 0.5 | 0.39 | 42 |

(Note):
*An agglomerate indissoluble in methanol was produced in a large amount.

In addition to the ingredients used in the Examples, other ingredients can be used in the Examples as set forth in the specification to obtain substantially the same results.

What we claim is:

1. A process for preparing polyvinyl alcohol particles, a 4% of by weight aqueous solution of which has a viscosity at 20° C. of not less than 80 cps, which comprises stirring in a heterogenous system polyvinyl ester particles having an intrinsic viscosity of not less than 1.3 dl/g with a solution consisting essentially of an alcohol and an alkali catalyst, said solution containing from 0.18 to 10 moles of the alkali catalyst per liter of the alcohol.

2. The process of claim 1, wherein said polyvinyl ester is polyvinyl acetate.

3. The process of claim 1, wherein said polyvinyl ester is a polyvinyl ester obtained by a suspension polymerization of a vinyl ester.

4. The process of claim 1, wherein said polyvinyl ester is a polyvinyl acetate obtained by a suspension polymerization of vinyl acetate.

5. The process of claim 1, wherein said alcohol is methanol.

6. The process of claim 1, wherein a concentration of said alkali catalyst in said alcohol is not less than 0.3 mole per liter of said alcohol.

7. The process of claim 1, wherein said 4% by weight aqueous solution of said polyvinyl alcohol has a viscosity at 20° C. of not less than 150 cps.

8. The process of claim 6, wherein said alcohol is methanol.

* * * * *